US007792507B2

(12) United States Patent
Sanders et al.

(10) Patent No.: US 7,792,507 B2
(45) Date of Patent: Sep. 7, 2010

(54) AUTOMATIC TV SIGNAL AND TUNER SETUP

(75) Inventors: Scott D. Sanders, Sammamish, WA (US); Mark D. Schwesinger, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1034 days.

(21) Appl. No.: 10/901,625

(22) Filed: Jul. 29, 2004

(65) Prior Publication Data

US 2006/0025092 A1    Feb. 2, 2006

(51) Int. Cl.
*H04B 1/18*    (2006.01)

(52) U.S. Cl. ............... 455/161.1; 455/168.1; 455/192.1; 725/86; 725/100

(58) Field of Classification Search ............... 455/161.1, 455/164.2, 168.1, 188.1, 192.1, 192.3; 725/100, 725/86, 92, 131, 118, 94; 348/731, 732, 348/38
See application file for complete search history.

(56) References Cited

U.S. PATENT DOCUMENTS

| | | | |
|---|---|---|---|
| 5,550,576 A | 8/1996 | Klosterman | |
| 5,684,525 A | 11/1997 | Klosterman | |
| 5,805,230 A | 9/1998 | Staron | |
| 5,990,883 A | 11/1999 | Byrne et al. | |
| 6,003,041 A | 12/1999 | Wugofski | |
| 6,064,449 A | 5/2000 | White et al. | |
| 6,340,997 B1 | 1/2002 | Borseth | |
| 6,567,982 B1 * | 5/2003 | Howe et al. | 725/100 |
| 6,600,503 B2 | 7/2003 | Stautner et al. | |
| 6,721,018 B1 * | 4/2004 | Shintani et al. | 348/731 |
| 6,826,775 B1 * | 11/2004 | Howe et al. | 725/40 |
| 2002/0089603 A1 | 7/2002 | Onomatsu | |
| 2002/0157106 A1 | 10/2002 | Uskali et al. | |
| 2003/0215211 A1 | 11/2003 | Coffin, III | |

FOREIGN PATENT DOCUMENTS

JP    HEI06-133245    5/1994

(Continued)

OTHER PUBLICATIONS

PCT International Search Report dated Sep. 28, 2006, from counterpart PCT patent application, International Application No. PCT/US04/35109, copy attached, 2 pages.

(Continued)

*Primary Examiner*—Yuwen Pan
*Assistant Examiner*—Ankur Jain
(74) *Attorney, Agent, or Firm*—Lee & Hayes, PLLC

(57) ABSTRACT

A system and methods perform an automatic TV signal/tuner setup in a tuner device (e.g., a PC, a personal video recorder, a set-top box, etc.) that has one or more tuners. The setup identifies the number of tuners in the device, whether the tuners are analog or digital, and what broadcast standard each tuner supports. The geographic region in which the device will be receiving TV signals is identified, and tuners supporting that region are identified. Digital tuners are reported as being digital, while analog tuners are scanned to locate valid TV signals, and to determine the source of any valid TV signals (e.g., an antenna, a cable provider, a set-top box).

28 Claims, 5 Drawing Sheets

FOREIGN PATENT DOCUMENTS

| | | |
|---|---|---|
| JP | 2000354207 (A) | 12/2000 |
| JP | 2001309261 (A) | 11/2001 |
| JP | 2003304458 (A) | 10/2003 |
| JP | 2004023451 (A) | 1/2004 |
| RU | 2195083 (C2) | 12/2002 |
| RU | 2202155 (C2) | 4/2003 |
| WO | WO9627982 A | 9/1996 |

OTHER PUBLICATIONS

EP Search Report for Application No. EP04796158, mailed Jun. 22, 2007 (3 pages).

* cited by examiner

AUTOMATIC TV SIGNAL AND TUNER SETUP

TECHNICAL FIELD

The present disclosure generally relates to television media, and more particularly to configuring TV signals and TV tuners.

BACKGROUND

Computers, such as PCs (personal computers), are increasingly becoming media focal points that provide users with numerous entertainment options involving various media types. For example, PCs are commonly used to access digital music over the Internet, and to organize, playback, and transfer the digital music to various storage media and playback devices according to a user's desires. Video content can be similarly managed using PCs. This evolution of PCs into home entertainment centers has more recently expanded to include TV (television) media as an entertainment option that is accessible through the PC.

In general, there are various ways to access TV media, including for example, through terrestrial broadcast systems, cable broadcast systems, and satellite broadcast systems. In a terrestrial system, a rooftop antenna can pick up digital and/or analog TV signals broadcast by a TV station. An analog tuner in a TV coupled to the antenna can tune to particular broadcast frequencies, allowing a user to experience the media carried by the various analog broadcast TV signals/channels. Likewise, a TV set with a digital tuner enables tuning to frequencies carrying digital TV signals. A set-top box (STB) or receiver may also receive digital or analog signals from a satellite, a cable, or a terrestrial source. The STB may tune in digital signals (e.g., in ATSC format) and convert them to analog signals (e.g., in NTSC, PAL, or SECAM format), and send the analog signals to a TV at a particular frequency (e.g., 60-MHz (channel 3) or 66-MHz (channel 4)) that can be tuned to with an analog TV tuner. In this case, a user changes channels by adjusting the STB tuner while leaving the TV tuned to the channel output by the STB. An STB or receiver might also output the TV signal in a digital format such as DVB (Digital Video Broadcasting) or ATSC (Advanced Television Systems Committee). A TV (e.g., an HDTV) with a digital tuner then allows a user to experience the media carried by the TV signal.

As signal broadcast standards have evolved, so too have the standards for signal connectors. Thus, TV devices and components (e.g., VCRs, set-top boxes, TVs, PC tuner cards, etc.) typically include an array of cable, antenna, and auxiliary hardware connector types for input ports to interconnect different signals from various components. Accordingly, a TV set or a tuner card for a PC may have multiple input ports, such as RF, composite, S-Video and component inputs, to accommodate a variety of scenarios. Newly built set-top boxes typically have S-Video outputs, while set-top boxes built 5 years ago may only have a composite video output. A tuner card likely includes the necessary input ports to accommodate both the newer and older set-top boxes. Accordingly, there are a variety of ways in which components may be interconnected depending on the signal type and source that a user is using to access TV media.

The variety of signal types, formats, sources, interconnects, and so on, can be problematic for users who need to configure one or more tuners with respect to their current TV signal source (e.g., cable service, direct broadcast satellite). Users typically do not encounter such tuner setup problems with certain OEM devices such as set-top boxes, personal video recorders, or VCRs, because the OEM of such a device knows the number and types of tuners in the device, and has already preconfigured TV signals and tuners within such devices appropriately. However, with PCs, different OEMs may provide a variety of different tuner configurations. Furthermore, PC users may add tuners, remove tuners, switch tuners, or move tuners to different slots within PCs. Thus, for PCs and other devices that may have a variety of different tuner configurations, the signal/tuner setup experience in these devices can be very complicated for the average PC user because of the variety of signal types, formats, sources, and interconnects. Typical setup questions that may be difficult for an average user to answer during a signal/tuner setup procedure might include, for example, what broadcast standard should be selected (e.g., NTSC, PAL, SECAM, DVB, ATSC), how many tuners should be configured for the selected broadcast standard, what connector type is the TV signal connected to (e.g., RF, Composite Video, S-Video, Component), and how the TV signal is being provided (e.g., an antenna, cable provider, set-top box). As PCs continue to evolve into entertainment hubs that seek to provide users with ever increasing options for viewing and recording different TV signals from different TV media sources, setting up TV signals and tuners will only become more and more complex and time consuming.

Accordingly, a need exists for a way of setting up TV signals and tuners in environments where a variety of different tuner configurations may exist, such as in a PC that is enhanced for home entertainment.

SUMMARY

A system and methods perform an automatic TV signal/tuner setup in a tuner device (e.g., a PC, a personal video recorder, a set-top box, etc.) that has one or more tuners. The setup identifies the number of tuners in the device, whether the tuners are analog or digital, and what broadcast standard each tuner supports. The geographic region in which the device will be receiving TV signals is identified, and tuners supporting that region are identified. Digital tuners are checked for signal lock, while analog tuners are scanned to locate valid TV signals, and to determine the source of any valid TV signals (e.g., an antenna, a cable provider, a set-top box). After all tuners on the device are scanned, a report is provided to a user that summarizes the results of the tuner scanning.

For analog tuners, auxiliary input ports on a tuner (e.g., S-Video, Composite, Component) are scanned in turn, until valid auxiliary TV signals are found on one of the tuner inputs. If auxiliary signals are found on a current tuner, the device is checked for additional tuners, and the system reports the current analog tuner as having a set-top box signal after all tuners in the device have been scanned. If no auxiliary signals are detected on the current tuner, the system scans a geographic dependent cable tuning space and a geographic dependent antenna tuning space to determine whether the TV signal source is cable or antenna. If the source is determinable, the device is checked for additional tuners and the system reports the analog tuner as having either a cable signal source or an antenna signal source after all tuners in the device have been scanned. If the system cannot conclude whether the signal source is cable or antenna, it then scans an indeterminate set of frequencies that fall within both the cable tuning space and the antenna tuning space. If the system determines that the signal source is cable/antenna indeterminate, the device is checked for additional tuners, and after all tuners in the device have been scanned, the user is queried to determine whether the source is cable or antenna. If the system determines that the signal source is not cable/antenna indeterminate, it then determines whether the identified region supports RF set-top boxes. If so, the system scans a region-specific set of RF set-top box frequencies. If enough signals are detected in the region-specific set of RF set-top box frequencies, the current analog tuner is reported as having a set-top box signal after all tuners in the device have been scanned. Otherwise the system checks the device for additional tuners, and after all tuners in the device have been scanned, it reports that no signal was detected on the current tuner.

BRIEF DESCRIPTION OF THE DRAWINGS

The same reference numerals are used throughout the drawings to reference like components and features.

DETAILED DESCRIPTION

Introduction

The following discussion is directed to a system and methods that provide an automated setup procedure for setting up TV signals and tuners in devices that have one or more tuners configurable in a variety of different ways, such as in a PC that is enhanced for home entertainment. One example of such a device is a Media Center PC running Windows XP Media Center Edition available from Microsoft Corporation in Redmond, Wash.

Typically, setting up TV signals and tuners in such devices is performed by a user through a "manual" procedure during a "first run" of the device (i.e., when the device is new or newly reconfigured). The automated procedure described herein provides several advantages, including a significant reduction in the complexity of setting up TV signals and tuners in such devices. The burden is reduced for users to understand technical details such as what broadcast standard should be selected, how many tuners should be configured for the selected broadcast standard, what type of connector the TV signal is connected to, and the source of the TV signal. This reduces setup time and helps make the setup procedure a more pleasant experience.

Exemplary Environment

Figure 1:
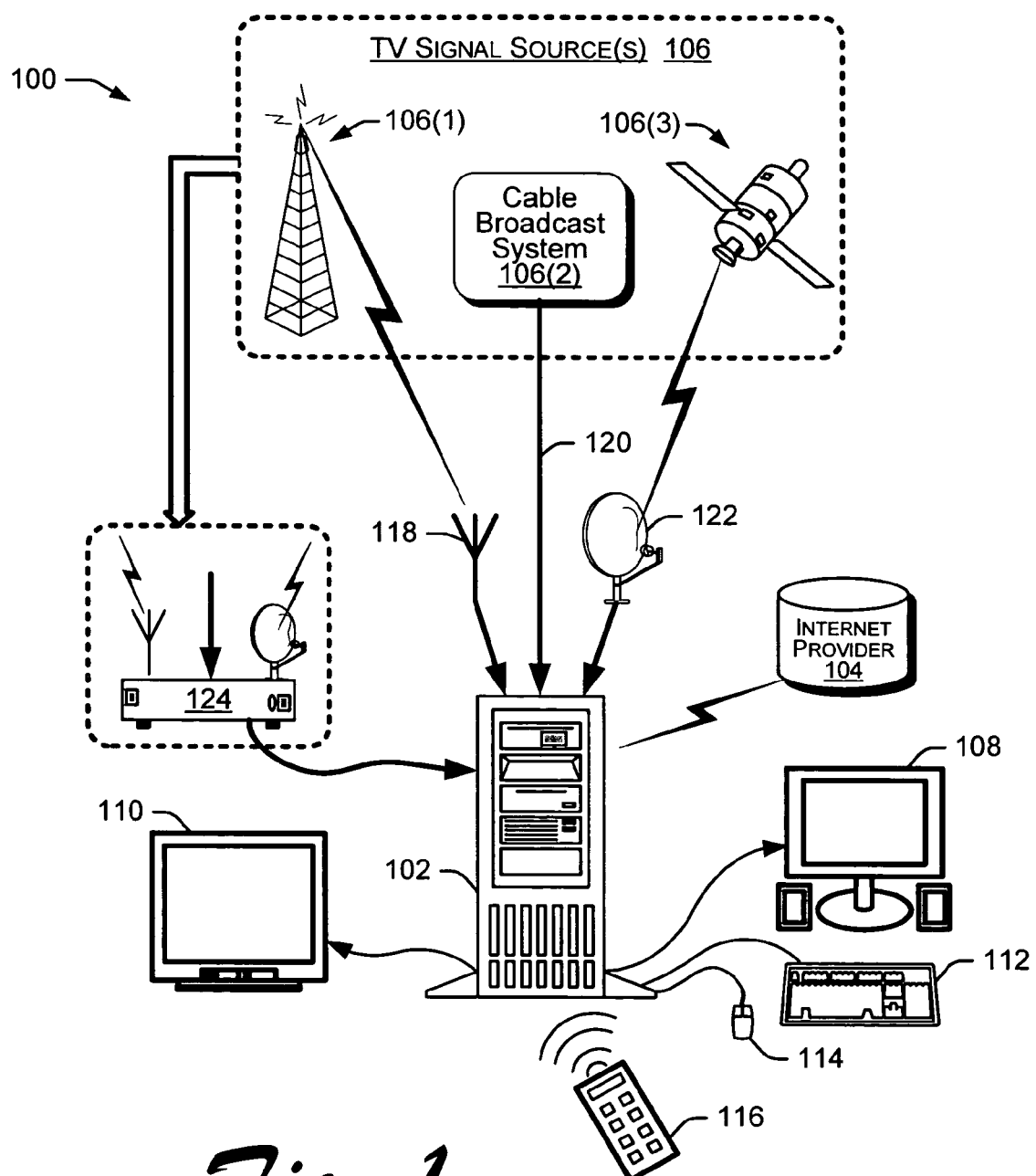
FIG. 1 illustrates an exemplary environment suitable for automatically setting up TV signals in a tuner device having one or more TV tuners.

FIG. 1 illustrates an exemplary environment 100 suitable for automatically setting up TV signals in a tuner device 102 having one or more tuners. In the exemplary environment 100, tuner device 102 is implemented as a Media Center PC running Windows XP Media Center Edition operating system available from Microsoft Corporation in Redmond, Wash. It is noted, however, that this implementation is provided by way of example only, and not by way of limitation. Thus, tuner device 102 may also be implemented as any number of other devices employing one or more tuners configurable in a variety of ways for receiving TV signals. For example, tuner device 102 may include devices such as set-top boxes, personal video recorders (PVRs), television sets, and so on. Hereinafter, however, tuner device 102 will be referred to as being a PC (personal computer) 102.

PC 102 is typically capable of performing common computing functions, such as email, calendaring, task organization, word processing, Web browsing, and so on. In addition, PC 102 serves as a media hub providing access to a variety of media from different media sources such as an Internet provider 104 and TV broadcast signal sources 106. Media is delivered to a user through video and audio output devices coupled to PC 102, such as LCD monitor and speakers 108 and television set 110. A user accesses different computing and media entertainment choices available from PC 102 using various input control devices, including for example, keyboard 112, mouse 114, and remote control 116. An exemplary computing environment for implementing a PC 102 is described in more detail herein below with reference to FIG. 6.

The exemplary environment 100 of FIG. 1 also illustrates the availability of several different physical TV signal sources 106. A user is most likely to subscribe to or use one or two of these sources 106, but usually not all of them. These sources include a terrestrial/OTA (over the air) television broadcast system 106(1), a cable broadcast system 106(2), and a satellite broadcast system 106(3). The exemplary environment 100 illustrates that these signal sources 106 may be input to PC 102 directly (e.g., through RF antenna 118, cable 120, or satellite dish 122), or they may be input to PC 102 through a set-top box (STB) 124. STB 124 may be implemented in various ways such as by a satellite receiver, cable TV receiver, OTA (over the air)/terrestrial receiver, PVR (personal video recorder), and the like. Various other physical sources of multimedia content are generally accessible by PC 102 also, including for example, Internet provider 104 and local devices (not specifically illustrated) such as a hard disk drive, a DVD player, or an audio CD-ROM player.

Set-top box (STB) 124 performs the functions of a conventional unit of this nature, such as controlling channel selection and decoding premium broadcast channels. Although not illustrated in FIG. 1, one or more infra-red (IR) emitters may be available to remotely control various STB functions, such as channel changing. STB 124 may select from different available physical sources 106. Thus, STB 124 may have interfaces that connect to an RF antenna 118 for receiving terrestrial broadcasts, a cable 120 for receiving cable broadcasts, or a satellite dish 122 for receiving satellite broadcasts. STB 124 may also have an interface to connect to a modem (not shown) for communicating with an Internet provider 104 and to receive Internet content.

Exemplary Embodiment

Figure 2:
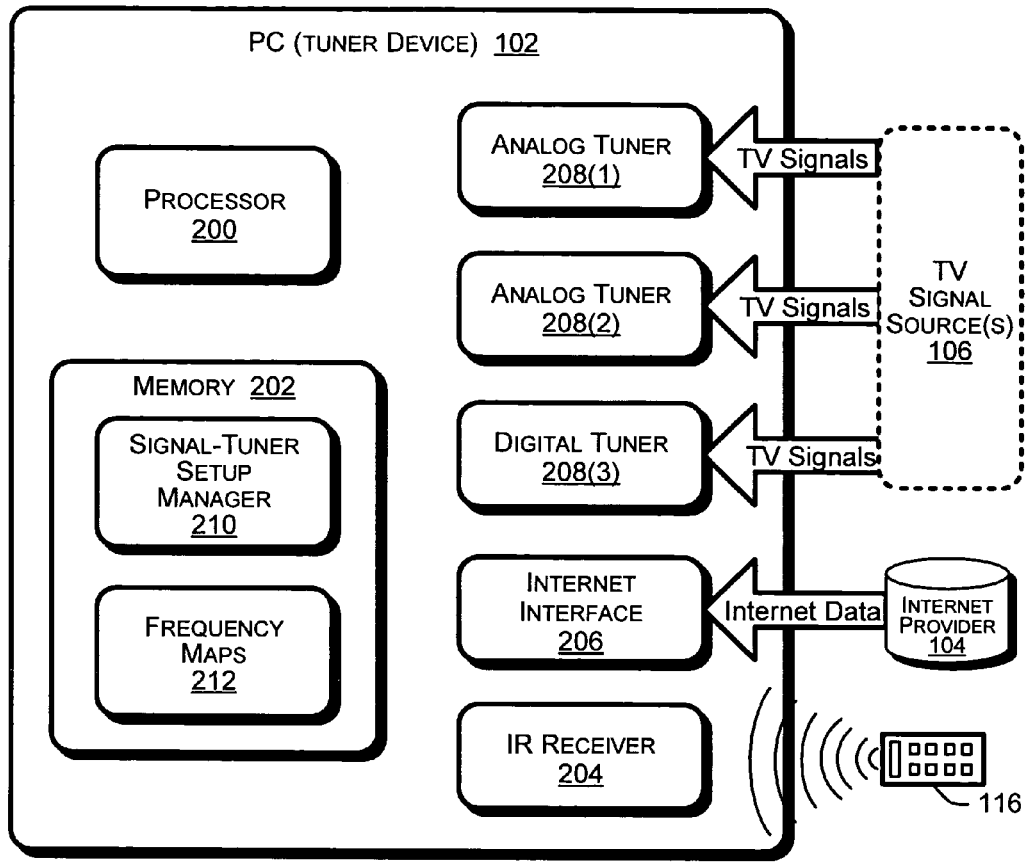
FIG. 2 illustrates an exemplary embodiment of a PC, showing various components of the PC that facilitate an automatic set up of TV signals with respect to one or more TV tuners in the PC.

FIG. 2 illustrates an exemplary embodiment of PC 102, showing various components of PC 102 that facilitate an automatic set up of TV signals with respect to one or more tuners, and the delivery of a variety of media content from different sources such as TV broadcast signal sources 106. PC 102 includes logic hardware in the form of one or more processors 200 and associated storage memory 202. Memory 202 includes electronic, randomly accessible memory, and might also include disk-based memory or other similar types of storage. PC 102 also includes an infra-red (IR) receiver 204 for receiving commands from a remote control handset 116 (FIG. 1), a data or Internet interface 206 for exchanging data with Internet provider 104, and one or more tuners 208 for receiving TV signals from various TV signal sources 106 such as a terrestrial television broadcast system 106(1), a cable broadcast system 106(2), and a satellite broadcast system 106(3). Processor 200 is connected to receive commands from IR receiver 204 and to communicate with the other interfaces and tuners 208. The remote control handset 116 of the PC 102 works in conjunction with PC 102 to allow a user to give various commands to PC 102. As noted above, an exemplary computing environment for implementing a PC 102 is described in more detail herein below with reference to FIG. 6.

The exemplary embodiment of PC 102 also includes an automatic TV signal and tuner setup application, referred to in FIG. 2 as signal-tuner setup manager 210. Signal-tuner setup manager 210 executes on data processor 200 from memory 202. The signal-tuner setup manager 210 controls an automated setup procedure that analyzes the PC's 102 tuner configuration and input TV signals in accordance with a geographical region in which PC 102 is operating. Signal-tuner setup manager 210 identifies the appropriate geographic region by querying the user for geographic identification information such as a zip code or country code, and uses this information to locate an appropriate frequency map 212 stored in memory 202. A frequency map 212 provides information about what TV signal sources 106 are available in the identified geographic region as well as channel frequencies that are most likely to be in either a cable tuning space or a terrestrial (antenna) tuning space for the identified region. The automated setup procedure enables the PC 102 to provide the user with the most advantageous television programming experience available without exposing the user to an often complicated and time consuming manual setup procedure.

Depending on the signal sources 106 that a user subscribes to or uses, and the geographic region in which the PC 102 is operating, TV signals of varying broadcast standards may be coupled to one or more tuners 208 of PC 102. For example, a user may subscribe to receive TV service from a cable broadcast system 106(2) that broadcasts programming in NTSC (National Television System Committee) signal format. The NTSC format is analog TV signal that is used in, for example, North America, Japan, South Korea, Burma, Taiwan, the Philippines, and much of South America. The PAL (Phase Altering Line) signal format is an alternative to NTSC that is used in most of Europe, Asia, Africa, Australia, and parts of South America. The SECAM (Sequential Color And Memory) signal format is another alternative to NTSC used in the former USSR, France, parts of Eastern Europe, the Middle East, and Africa. In general, TV signals in these. formats might originate from a terrestrial/OTA (over the air) television broadcast system 106(1), a cable broadcast system 106(2), or a satellite broadcast system 106(3).

In addition to analog signal formats such as NTSC, PAL, and SECAM, a user may receive TV signals in a digital format such as ATSC (Advanced Television System Committee) or DVB (Digital Video Broadcasting). ATSC format is used by terrestrial or OTA (over the air) broadcasts in the United States and Canada. DVB format is a standard used in various places throughout the world.

Depending on the particular TV signal source 106, TV signals may enter PC 102 directly, or through a set-top box (STB). That is, an analog or digital TV signal from a cable broadcast system 106(2), for example, may be input directly into an appropriate input to a tuner 208 on PC 102, or it may first be run through an STB 124. Both scenarios are illustrated in FIG. 1. Likewise, an analog or digital TV signal from a terrestrial broadcast system 106(1) or a satellite broadcast system 106, may be coupled directly (i.e., off an antenna or satellite dish, respectively) into an appropriate input to a tuner 208 on PC 102, or it may first be run through an STB 124.

Figure 3:
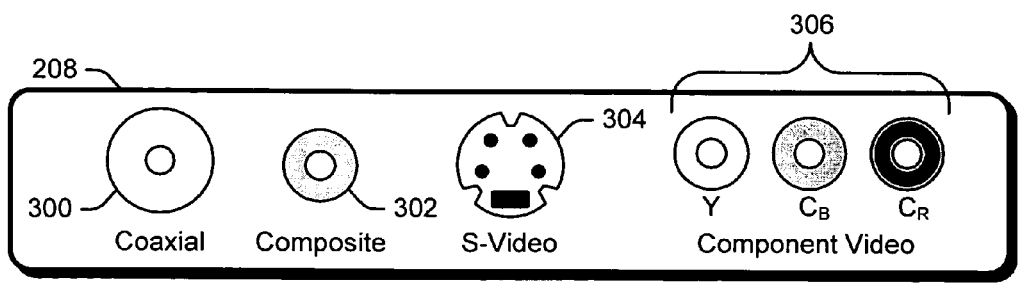
FIG. 3 illustrates an exemplary embodiment of the back side of a tuner card.

Tuner cards 208 in PC 102 typically include an array of cable, antenna, and auxiliary hardware connector types for input ports to couple different TV signals into PC 102. FIG. 3 provides a view of the back side of an exemplary tuner card 208 showing an example of some of the input connector types that may be present on a tuner card 208. The coaxial input 300 may be used, for example, to directly couple in RF signals off of a terrestrial antenna or to directly couple in signals from a cable source. Auxiliary inputs, such as composite video input 302, S-video input 304, and component video inputs 306, typically couple in various types of signals from a set-top box (STB), satellite receiver, personal video recorder (PVR), and the like. Tuner cards 208 are likely to have various types of auxiliary input port connectors in order to accommodate both older and newer versions of various STB devices. Accordingly, there are a variety of ways in which a variety of TV signal types and sources may be input into a tuner card 208 within PC 102.

Signal-tuner setup manager 210 manages an automatic setup procedure that simplifies the initial TV signal/tuner setup for the myriad TV signal and tuner 208 interconnect configurations that are possible within a PC 102.

Exemplary Methods

Example methods for automatically setting up TV signals in a tuner device 102 (e.g., PC 102) having one or more tuners 208 will now be described with primary reference to the flow diagram of FIGS. 4 and 5. The methods apply to the exemplary embodiments discussed above with respect to FIGS. 1-3. While one or more methods are disclosed by means of flow diagram and text associated with the blocks of the flow diagram, it is to be understood that the elements of the described methods do not necessarily have to be performed in the order in which they are presented, and that alternative orders may result in similar advantages. Furthermore, the methods are not exclusive and can be performed alone or in combination with one another. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), a rewritable compact disc (CD-RW) (optical), and a portable compact disc read-only memory (CDROM) (optical).

At block 402 of method 400, one or more tuners 208 in PC 102 are identified/enumerated. A signal-tuner setup manager 210 is generally configured to perform an automatic setup of TV signals with respect to one or more tuners in PC 102. The setup manager 210 identifies the tuners 208 in PC 102, which includes locating each tuner and determining the number of tuners present in the PC 102, as well as identifying a broadcast standard supported by each tuner and identifying input connector types available for each tuner. Identifying the tuners 208 in PC 102 also includes identifying the geographical region in which the PC 102 will be receiving TV signals. Identifying the geographical region typically includes querying a user as to the postal zip code or country code in which the PC 102 will operate, or obtaining such information from the operating system of PC 102.

At block 404, the setup manager 210 filters the list of tuners 208 from block 402 based on those tuners that support the user's identified geographic region. In general, those tuners that support the identified geographic region will be reported to the user by the setup manager 210 in the automatic setup process.

At block 406, the setup manager 210 scans a current tuner and determines whether it is a digital tuner, such as digital tuner 208(3) (FIG. 2), or an analog tuner, such as analog tuner 208(1) and 208(2) (FIG. 2). If the current tuner being scanned is a digital tuner, the digital tuner is inspected for a signal lock as shown at block 408, which indicates whether there is a valid digital signal connected to the input of the digital tuner. The setup manager 210 then checks for the presence of additional tuners at block 410, moves to a next tuner if one is present as shown at block 412, and scans the next tuner to determine if it is digital or analog as shown again at block 406. After all tuners in device 102 have been scanned, a report is provided to the user summarizing the results of the tuner scan/setup, as shown at block 434. For example, if the current tuner is a digital tuner that has a detected signal lock, the digital tuner will be reported to the user at block 434. If no tuners are found during the setup, however, the report informs the user that no tuners were found, as shown at blocks 430 and 432.

Referring again to block 406, if the current tuner is an analog tuner, the setup manager 210 proceeds to scan the analog tuner to determine whether it is connected to a valid analog TV signal source and what type of TV signal source it is connected to, as discussed below with respect to blocks 414-434.

At block 414, the setup manager 210 scans a current analog tuner to determine if it has an auxiliary input signal, such as an S-video input signal, a composite video input signal, a component video input signal, or a SCART (Syndicat des Constructeurs d'Appareils Radiorécepteurs et Téléviseurs) video input signal. At block 416, if auxiliary signals are detected on the current tuner, the setup manager 210 checks for the presence of additional tuners (block 410), and if another tuner is present it begins the method 400 again by scanning the next tuner to determine if the next tuner is digital or analog (at blocks 412 and 406). After all the tuners have been scanned, the setup manager 210 will report the current analog tuner (i.e., the tuner for which auxiliary signals were detected) as having set-top box (STB) signal inputs, as shown at block 434. In regions where STBs output on different broadcast standards (e.g., PAL-B vs. SECAM-L), such as in France, the setup manager 210 will also report this information to the user or ask the user to verify a default for this region.

At block 418, if auxiliary signals are not detected on the current tuner (i.e., at block 414), the setup manager 210 then scans the tuner for cable-only and antenna-only channel sets or frequencies, as shown at block 418. Scanning for cable-only and antenna-only channel sets includes accessing a frequency map 212 based on an identified geographic region in which the TV tuner device will receive TV signals. As noted above regarding block 402, the geographical region is typically identified by querying a user as to the postal zip code or country code in which the PC 102 will operate. The frequency map 212 identifies a cable tuning space and an antenna tuning space in which the TV signals are expected to be found. After the setup manager 210 accesses the appropriate frequency map 212, it scans the current analog tuner to detect valid TV signals within both the cable space and the antenna space at those channel frequencies identified by the frequency map.

At block 420, the setup manager 210 determines from the scan of the cable space and the antenna space if a TV signal source for the current tuner can be conclusively identified as a cable source or as an antenna source. To determine if the signal source is a cable source, there must me more valid TV signals detected in the cable space than are detected in the antenna space. In addition, the number of valid TV signals detected in the cable space must exceed a minimum threshold of channels. If these criteria are met, the setup manager 210 concludes or determines that the TV signal source for the current tuner is a cable source. In this circumstance, the setup manager 210 checks for the presence of additional tuners (block 410), and if another tuner is present it begins the method 400 again by scanning the next tuner to determine if the next tuner is digital or analog (at blocks 412 and 406). After all the tuners have been scanned, the setup manager 210 will report the current analog tuner (i.e., the tuner just determined to have cable signal source) to the user as having a cable signal source, as shown at block 434.

At block 420, in order for the setup manager 210 to determine if the signal source is an antenna source (rather than a cable source), there must me more valid TV signals detected in the antenna space than are detected in the cable space. In addition, the number of valid TV signals detected in the antenna space must exceed a minimum threshold of channels. If these criteria are met, the setup manager 210 concludes or determines that the TV signal source for the analog tuner is an antenna source. In this circumstance, the setup manager 210 checks for the presence of additional tuners (block 410), and if another tuner is present it begins the method 400 again by scanning the next tuner to determine if the next tuner is digital or analog (at blocks 412 and 406). After all the tuners have been scanned, the setup manager 210 will report the current analog tuner (i.e., the tuner just determined to have an antenna signal source) as having an antenna signal source, as shown at block 434.

Figure 4:
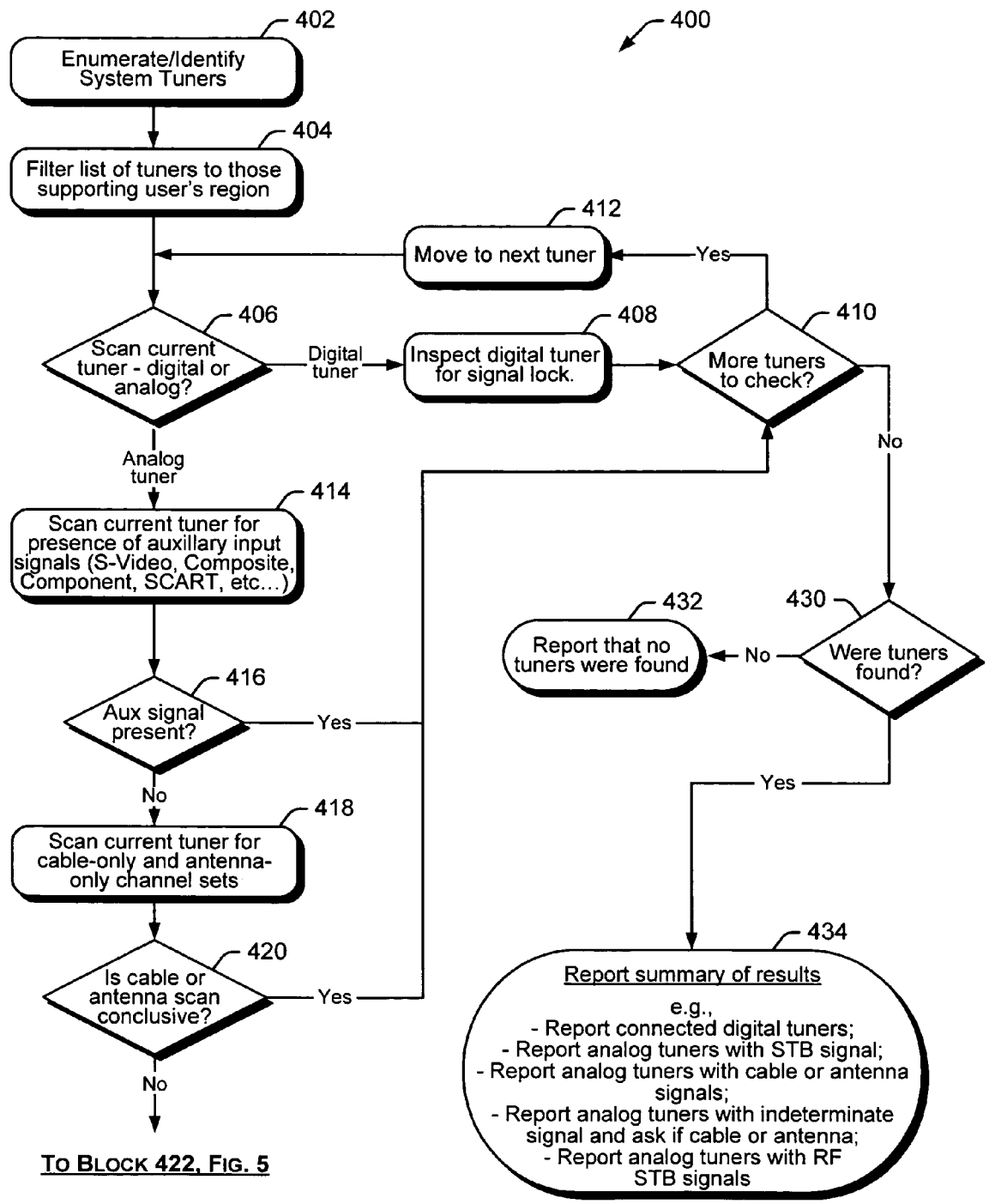
FIGS. 4 and 5 are flow diagrams illustrating exemplary methods for automatically setting up TV signals in a tuner device having one or more TV tuners.
Figure 5:
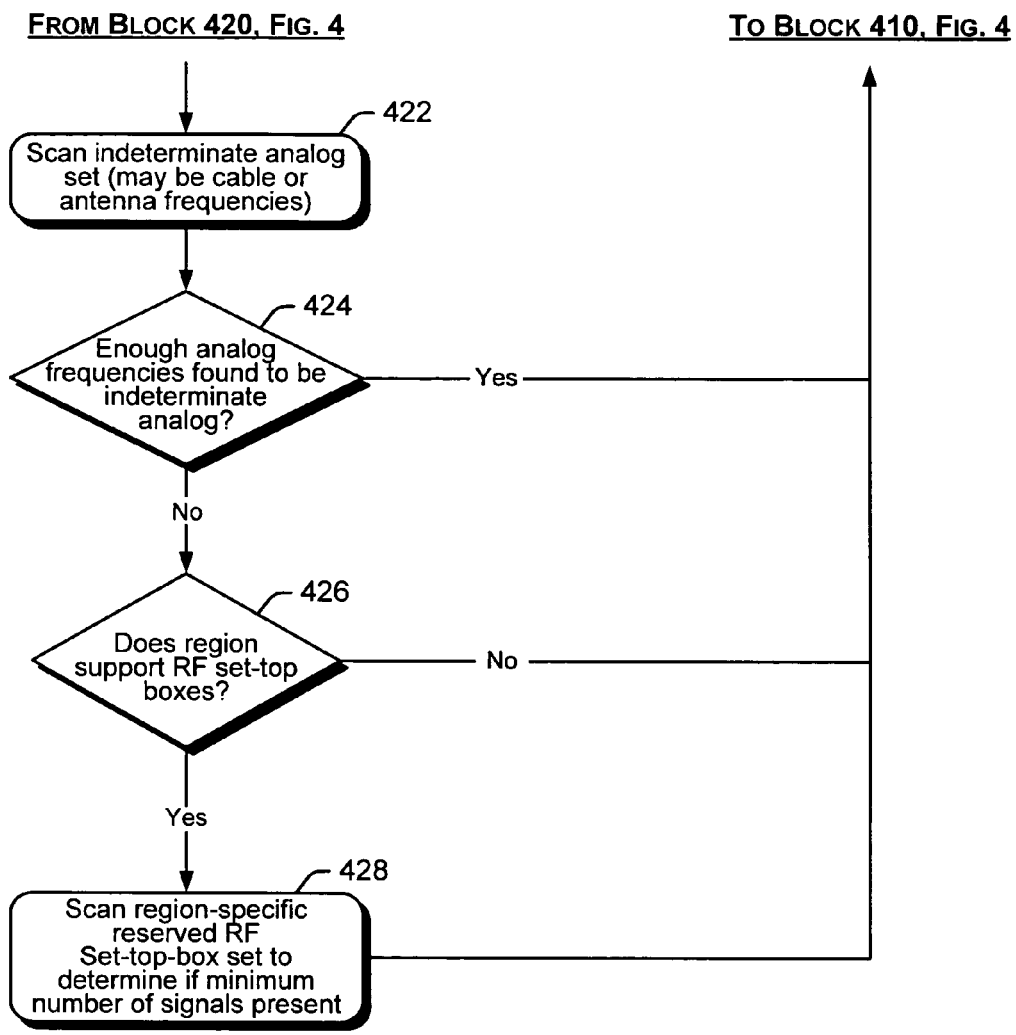

At block 420, if the scan of the cable space and the antenna space is not conclusive (i.e., the setup manager 210 cannot conclusively determine whether the TV signal source is cable or antenna), then the setup manager 210 scans an indeterminate set of channel frequencies, as shown at block 422, continuing from FIG. 4 onto FIG. 5. The indeterminate set of frequencies is also accessed from the appropriate frequency map 212 according to the identified geographic region. The indeterminate set of frequencies may be frequencies from within the normal cable tuning space and/or frequencies within the normal antenna tuning space.

At block 424, the setup manager 210 determines if enough analog frequencies are detected in the indeterminate set of frequencies to conclude that the signal source is indeterminate. If the number of valid TV signals detected in the indeterminate set of frequencies exceeds a minimum threshold, then the setup manager 210 concludes that the signal source is indeterminate analog. That is, the signal source is either cable or analog, but the setup manager 210 does not know which. In this circumstance, the setup manager 210 checks for the presence of additional tuners (block 410), and if another tuner is present it begins the method 400 again by scanning the next tuner to determine if the next tuner is digital or analog (at blocks 412 and 406). After all the tuners have been scanned, the setup manager 210 will report the current analog tuner (i.e., the tuner just determined to have an indeterminate, cable or antenna, analog signal source) to the user as having an indeterminate cable or antenna signal source, as shown at block 434. The setup manager 210 then queries the user to determine whether the signal source is cable or antenna.

If, at block 424, the setup manager 210 determines that there are not enough signals detected in the indeterminate set, the setup manager 210 determines from the appropriate frequency map whether or not the geographical region supports RF set-top boxes, as shown at block 426. If the geographical region supports RF set-top boxes, the setup manager scans the region-specific set of RF set-top box frequencies reserved for the region, as shown at block 428. Like the other frequency sets above, the set of RF set-top box frequencies is accessed from the frequency map 212 for the identified geographic region.

At block 428, the setup manager 210 determines whether enough signals are detected within the set of RF set-top box frequencies to conclude the signal source is an RF set-top box. If a minimum threshold is exceeded, the setup manager 210 concludes that the TV signal source for the current analog tuner is an RF set-top box. The setup manager 210 then checks for the presence of additional tuners (block 410), and if another tuner is present it begins the method 400 again by scanning the next tuner to determine if the next tuner is digital or analog (at blocks 412 and 406). After all the tuners have been scanned, the setup manager 210 will report the current analog tuner (i.e., the tuner just determined to have an RF set-top box analog signal source) as having a set-top box signal source as shown at block 434.

If, at block 428, the setup manager 210 cannot conclude that there is an RF set-top box signal source, or, at block 426 determines that the geographic region does not support RF set-top boxes, then, the setup manager 210 checks for the presence of additional tuners (block 410), and if another tuner is present it begins the method 400 again by scanning the next tuner to determine if the next tuner is digital or analog (at blocks 412 and 406). If there are no other remaining tuners that have not been scanned, the setup manager 210 reports a summary of the scanning results to the user as shown at block 434 and as mentioned throughout this discussion. If the setup manager 210 is unable to locate any tuners during the setup process, however, the report informs the user that no tuners were found, as shown at blocks 430 and 432.

Exemplary Computing Environment

Figure 6:
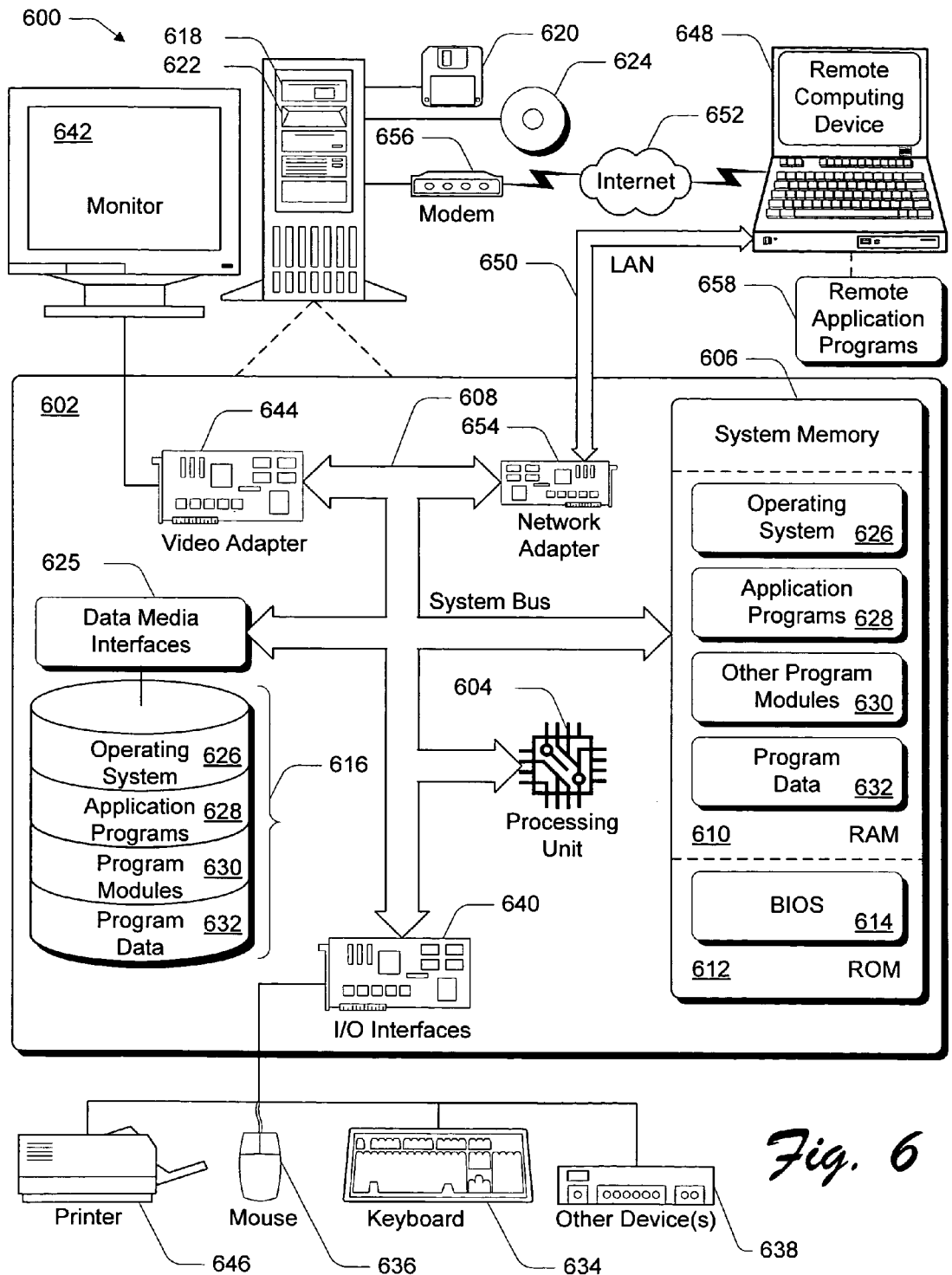
FIG. 6 illustrates an exemplary computing environment suitable for implementing a PC such as that discussed with reference to FIG. 2.

FIG. 6 illustrates an exemplary computing environment suitable for implementing an automatic setup procedure to set up TV signals in a device having one or more TV tuners, such as PC 102 discussed herein above. Although one specific configuration is shown in FIG. 6, such computing devices may be implemented in other computing configurations.

The computing environment 600 includes a general-purpose computing system in the form of a computer 602. The components of computer 602 may include, but are not limited to, one or more processors or processing units 604, a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. An example of a system bus 608 would be a Peripheral Component Interconnects (PCI) bus, also known as a Mezzanine bus.

Computer 602 includes a variety of computer-readable media. Such media can be any available media that is accessible by computer 602 and includes both volatile and non-volatile media, removable and non-removable media. The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 contains data and/or program modules that are immediately accessible to and/or presently operated on by the processing unit 604.

Computer 602 may also include other removable/non-removable, volatile/non-volatile computer storage media. By way of example, FIG. 6 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 625. Alternatively, the hard disk drive 616, magnetic disk drive 618, and optical disk drive 622 may be connected to the system bus 608 by a SCSI interface (not shown).

The disk drives and their associated computer-readable media provide non-volatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof) may include an embodiment of a caching scheme for user network access information.

Computer 602 can include a variety of computer/processor readable media identified as communication media. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device may also be connected to the system bus 608 via an interface, such as a video adapter 644. In addition to the monitor 642, other output peripheral devices may include components such as speakers (not shown) and a printer 646 which can be connected to computer 602 via the input/output interfaces 640.

Computer 602 may operate in a networked environment using logical connections to one or more remote computers, such as a remote computing device 648. By way of example, the remote computing device 648 can be a personal computer, portable computer, a server, a router, a network computer, a peer device or other common network node, and the like. The remote computing device 648 is illustrated as a portable computer that may include many or all of the elements and features described herein relative to computer system 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet. When implemented in a LAN networking environment, the computer 602 is connected to a local network 650 via a network interface or adapter 654. When implemented in a WAN networking environment, the computer 602 includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components, such as the operating system, are illustrated herein as discrete blocks, although it is recognized that such programs and components reside at various times in different storage components of the computer system 602, and are executed by the data processor(s) of the computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
    identifying tuners in a tuner device via a tuner setup manager stored in memory and executable on a processor of the tuner device, wherein the identifying comprises:
        identifying a geographical region in which the tuner device will receive TV signals;
        identifying a quantity of tuners in the tuner device;
        identifying a broadcast standard supported by each tuner; and
        identifying an input connector type for each tuner;
    determining whether each tuner is an analog tuner or a digital tuner;
    reporting each digital tuner to a user;
    reporting each analog tuner to the user; and
    if no tuners are identified, reporting that no tuners were found.

2. A method as recited in claim 1, wherein the reporting each digital tuner comprises inspecting each digital tuner for a signal lock.

3. A method as recited in claim 1, wherein the reporting each analog tuner comprises:
    scanning a current analog tuner for valid TV signals; and
    determining a source of the valid TV signals.

4. A method as recited in claim 1, wherein the tuner device comprises one of the following:
    a PC (personal computer)
    a set-top box;
    a personal video recorder;
    a video cassette recorder; or
    a television set.

5. A method as recited in claim 3, wherein the scanning comprises:
    scanning the current analog tuner for auxiliary input signals.

6. A method as recited in claim 5, further comprising:
    if auxiliary input signals are found,
    checking for the presence of additional tuners;
    if one or more additional tuners are present, scanning a next tuner to determine if the next tuner is digital or analog; and
    after all tuners have been scanned, reporting the current analog tuner as having set-top box signals.

7. A method as recited in claim 5, further comprising:
    if auxiliary input signals are not found, scanning the current analog tuner for cable-only channel sets and antenna-only channel sets.

8. A method as recited in claim 7, wherein scanning the current analog tuner for cable-only channel sets and antenna-only channel sets comprises:
    accessing a frequency map based on an identified geographic region in which the tuner device will receive TV signals, the frequency map identifying a cable space and an antenna space in which the TV signals are expected; and
    scanning the current analog tuner to detect valid TV signals within the cable space and the antenna space at channel frequencies identified by the frequency map.

9. A method as recited in claim 8, further comprising:
    determining that a TV signal source for the current analog tuner is a cable source only if more valid TV signals are detected in the cable space than are detected in the antenna space, and, a detected number of valid TV signals in the cable space exceeds a minimum threshold; and
    determining that a TV signal source for the current analog tuner is an antenna source only if the TV signal source is not determined to be a cable source, and, a detected number of valid TV signals in the antenna space exceeds a minimum threshold.

10. A method as recited in claim 9, further comprising:
if the TV signal source for the current analog tuner is a cable source or an antenna source,
checking for the presence of additional tuners;
if one or more additional tuners are present, scanning a next tuner to determine if the next tuner is digital or analog; and
after all tuners have been scanned, reporting the current analog tuner as having cable signals or antenna signals.

11. A method as recited in claim 9, further comprising:
if the TV signal source for the current analog tuner is neither a cable source nor an antenna source, scanning for valid TV signals in an indeterminate set of frequencies identified in the frequency map, the indeterminate set of frequencies containing both cable and antenna frequencies.

12. A method as recited in claim 11, further comprising:
if a detected number of valid TV signals in the indeterminate set exceeds a minimum threshold,
checking for the presence of additional tuners;
if one or more additional tuners are present, scanning a next tuner to determine if the next tuner is digital or analog; and
after all tuners have been scanned, reporting the current analog tuner as having indeterminate signals and querying the user to determine if the valid TV signals are cable signals or antenna signals.

13. A method as recited in claim 12, further comprising:
if the current analog tuner does not have indeterminate signals, determining if the identified geographic region supports RF set-top boxes.

14. A method as recited in claim 13, further comprising:
if the identified geographic region supports RF set-top boxes, accessing a region-specific set of RF set-top box frequencies identified in the frequency map; and
scanning frequencies in the region-specific set of RF set-top box frequencies for valid TV signals.

15. A method as recited in claim 14, further comprising:
if a minimum number of valid TV signals is not detected in the region-specific set of RF set-top box frequencies,
checking for the presence of additional tuners;
if one or more additional tuners are present, scanning a next tuner to determine if the next tuner is digital or analog; and
after all tuners have been scanned, reporting the current analog tuner as having no detectable signal.

16. A method as recited in claim 14, further comprising:
if a minimum number of valid TV signals is detected in the region-specific set of RF set-top box frequencies,
checking for the presence of additional tuners;
if one or more additional tuners are present, scanning a next tuner to determine if the next tuner is digital or analog; and
after all tuners have been scanned, reporting the current analog tuner as having RF set-top box signals.

17. A memory comprising processor-executable instructions configured for:
identifying one or more tuners in a tuner device, wherein the identifying comprises:
identifying a geographical region in which the tuner device will receive TV signals;
identifying a quantity of tuners in the tuner device;
identifying a broadcast standard supported by each tuner; and
identifying an input connector type for each tuner;
scanning analog tuners for TV signals in accordance with a frequency map, the frequency map identifying tuning spaces in which TV signals are likely to be detected based on an identified geographic region; and
based on the scanning, reporting a TV signal source of the analog tuners to a user.

18. A memory as recited in claim 17, comprising further processor-executable instructions configured for:
querying a user to determine the geographic region, the geographic region being a location in which the TV signals will be received; and
receiving identification information from a user in response to the querying.

19. A memory as recited in claim 18, wherein the identification information is selected from the group comprising:
a country code; and
a zip code.

20. A memory as recited in claim 17, comprising further processor-executable instructions configured for:
determining that at least one tuner is a digital tuner;
inspecting the at least one digital tuner for a TV signal lock; and
reporting to the user that the at least one digital tuner has a digital signal source.

21. A memory as recited in claim 17, wherein the scanning is selected from the group comprising:
scanning for auxiliary input signals;
scanning for input signals in a cable tuning space, the cable tuning space being defined by the frequency map;
scanning for input signals in an antenna tuning space, the antenna tuning space being defined by the frequency map;
scanning for input signals in an indeterminate analog tuning space, the indeterminate analog tuning space including frequencies from both the cable tuning space and the antenna tuning space, and the indeterminate analog tuning space being defined by the frequency map; and
scanning for input signals in an RF set-top box tuning space, the RF set-top box tuning space being defined by the frequency map.

22. A memory as recited in claim 17, wherein the tuner device is selected from the group comprising:
a PC (personal computer)
a set-top box;
a personal video recorder;
a video cassette recorder; and
a television set.

23. A computer comprising the memory recited in claim 17.

24. A computer comprising:
one or more TV signal tuners; and
a signal-tuner setup manager configured to identify the one or more TV signal tuners, analyze signals at the inputs of the one or more TV signal tuners, and report a tuner type and a TV signal source type to a user, wherein the signal tuner setup manager is further configured to identify a geographical region in which the tuner device will receive TV signals, identify a quantity of tuners in the tuner device, identify a broadcast standard supported by each tuner, and identify an input connector type for each tuner.

25. A computer as recited in claim 24, further comprising a frequency map configured to provide likely frequencies in one or more tuning spaces where TV signals will be detected, the frequency map being based upon a geographical location in which the TV signals will be received.

26. A computer as recited in claim 24, wherein the one or more TV signal tuners is a digital tuner, and the signal-tuner setup manager is configured to inspect the digital tuner for a signal lock and report the digital tuner to a user as having a digital signal source.

27. A computer as recited in claim 24, wherein the one or more TV signal tuners is an analog tuner, and the signal-tuner setup manager is configured to analyze analog signals at the inputs of the analog tuner and to report the analog tuner to the user and identify the source of the analog signals, the source being selected from the group comprising:

a set-top box signal source;
a cable signal source; and
an antenna signal source.

28. A computer as recited in claim 24, selected from the group comprising:

a PC (personal computer)
a set-top box;
a personal video recorder;
a video cassette recorder; and
a television set.

* * * * *